United States Patent [19]

Anzai

[11] Patent Number: 5,412,294
[45] Date of Patent: May 2, 1995

[54] APPARATUS FOR PREVENTING TRANSMISSION SHOCK IN AUTOMATIC TRANSMISSION EQUIPPED VEHICLES

[75] Inventor: Kiyoharu Anzai, Himeji, Japan

[73] Assignee: Mitsubishi Denki Kabushiki Kaisha, Tokyo, Japan

[21] Appl. No.: 240,364

[22] Filed: May 10, 1994

[30] Foreign Application Priority Data

Aug. 11, 1993 [JP] Japan .................................. 5-199533

[51] Int. Cl.$^6$ .......................... H02P 7/00; B60K 17/06
[52] U.S. Cl. ...................................... 318/432; 318/139
[58] Field of Search ........................ 318/432, 433, 139;
 180/65.6, 65.7; 192/3.51, 4 R, 9; 74/10.5, 10.8,
 15.4, 15.6, 15.66, 112, 113, 114, 821, 826, 813 C

[56] References Cited

U.S. PATENT DOCUMENTS

| | | |
|---|---|---|
| 3,738,199 | 6/1973 | Kubo et al. . |
| 3,794,133 | 2/1974 | Sugiura et al. . |
| 4,021,712 | 5/1977 | Ishihara et al. ...................... 318/432 |
| 4,346,627 | 8/1982 | Kawamoto et al. . |
| 4,367,528 | 1/1983 | Kawamoto et al. . |
| 4,417,307 | 11/1983 | Kubo et al. . |
| 4,488,456 | 12/1984 | Taga et al. . |

FOREIGN PATENT DOCUMENTS 4328024  11/1992  Japan .

*Primary Examiner*—Bentsu Ro
*Attorney, Agent, or Firm*—Sughrue, Mion, Zinn, Macpeak & Seas

[57] ABSTRACT

The invention provides an apparatus for preventing transmission shock in an automatic transmission equipped vehicle which can reliably prevent the generation of the transmission shock by controlling the motor speed at shifting. The apparatus comprises a torque control means for controlling the motor drive torque, a speed control means for controlling the motor drive speed, a speed control initiation determination means for determining the time for initiating speed control based on a shift command, a speed control termination determination means for determining the time for terminating speed control based on an output shaft rpm, the shift command and the motor rpm, and a speed control and torque control switching means for switching into speed control or torque control based on the outputs of the speed control initiation determination means and the speed control termination determination means. The speed control and torque control switching means switches from torque control into speed control in response to the speed control initiation, and switches from speed control into torque control in response to the termination speed control. Speed control reduces the difference between the motor rpm and the value obtained by dividing the output shaft rpm by the gear ratio after shifting in response to the shift command is no more than a fixed value.

5 Claims, 3 Drawing Sheets

APPARATUS FOR PREVENTING TRANSMISSION SHOCK IN AUTOMATIC TRANSMISSION EQUIPPED VEHICLES

BACKGROUND OF THE INVENTION

1. Field of the Invention

This invention relates generally to an apparatus for preventing transmission shock in a vehicle equipped with an automatic transmission powered by an inverter driven motor. More particularly it relates to an apparatus for preventing transmission shock in a vehicle equipped with an automatic transmission which can reliably prevent transmission shock during a shift.

2. Description of the Related Art

Conventionally, in an automatic transmission equipped vehicles that run on the power of an engine via a transmission, it has been important to reduce transmission shock in order to improve ride comfort, therefore, various apparatuses for preventing transmission shock have been developed.

For example, in the apparatus for preventing transmission shock disclosed in Japanese Patent Publication No. 4-67058, the ignition timing of an engine is retarded to reduce the engine torque at the time of a transmission shift.

FIG. 3 is a timing chart showing the action of the apparatus for preventing transmission shock in a vehicle with an automatic transmission as described in the above reference.

In FIG. 3, (a) is the shift command C that shifts the automatic transmission up from second gear into the third gear, (b) is the input "rpm" Ri of the automatic transmission as it gradually reduces due to the shift into third gear, and (c) is the ignition timing Tp that is retarded when the transmission is shifted to third gear.

The action of this prior apparatus for preventing transmission shock in an automatic transmission equipped vehicle described in the above reference will be clarified with the following description in accordance with FIG. 3.

For example, when the shift command C to shift from second gear into third gear is generated at time t1, the gear change from the ratio G2 of second gear into the ratio G3 of third gear begins at time t2 after fixed response delay time.

At this time, by shifting the gear ratios, a difference between the input rpm Ri of the automatic transmission and a value (referred to as "divided output rpm value" hereinafter) obtained by dividing the output shaft rpm Ro by the gear ratio after shifting in response to the shift command C is generated to generate transmission shock. Accordingly, in order to reduce this transmission shock, the ignition timing Tp is retarded as shown in FIG. 3 so as to reduce the output torque of the engine.

Then, at time t3 when the difference between the input rpm Ri of the automatic transmission and the divided output rpm value decreases to no more than a fixed value, the ignition timing Tp starts to return to normal ignition timing, and at time t4, the shifting is terminated and the output torque is returned to nomal.

Even, in electric power type automatic transmission equipped vehicles powered by an inverter driven motor, similar methods of reducing the transmission shock by reducing the motor torque output during transmission shifting as in the engine powered type vehicle above are being used.

However, in this case, there is a problem in that the transmission shock is generated by the energy accumulated by the moment of inertia of the motor.

As mentioned above, the conventional apparatus for preventing transmission shock in an automatic transmission equipped vehicle has a problem in that it is difficult to prevent the transmission shock, since it is generated in proportion to the energy accumulated at the moment of inertia of the motor when shifting.

SUMMARY OF THE INVENTION

The present invention has been developed to resolve the above problem, and the object of the present invention is to provide an apparatus for preventing transmission shock in automatic transmission equipped vehicles which can reliably prevent the generation of transmission shock by controlling the motor speed during shifting.

The present invention resides in an apparatus for preventing transmission shock in an automatic transmission equipped vehicle powered by an inverter driven motor via the transmission, wherein the apparatus comprises:

- a torque control means for controlling the drive torque of the motor;
- a speed control means for controlling the drive speed of the motor via the torque control means;
- a motor rpm detection means for detecting the rpm of the motor;
- a shift command detection means for detecting the shift command of the automatic transmission;
- an output shaft rpm detection means for detecting the output shaft rpm of the automatic transmission;
- a speed control initiation determination means for determining the timing for initiating the speed control of the motor by sensing the shift command;
- a speed control termination determination means for determining the timing for terminating the speed control of the motor based on the output shaft rpm, the shift command and the motor rpm; and
- a speed control and torque control switching means for switching the control of the motor into the speed control and the torque control based on outputs of the speed control initiation determination means and the speed control termination determination means; where
- the speed control and torque control switching means switches the motor from the torque control into the speed control in response to the speed control initiation timing, and switches the motor from the speed control into the torque control in response to the speed control termination timing.

In the present invention, the speed control initiation is determined based on the shift command detected by the shift command detection means, and at the speed control initiation timing the speed control and torque control switching means is activated to switch the motor control from torque control into speed control so as to reduce the difference between the motor rpm and the divided output rpm value. Then, when the speed control termination determination means determines the termination timing by comparing the motor rpm and divided output rpm as mentioned above, the speed control and torque control switching means is activated so as to terminate the speed control and resume the torque control. As a result, the shock from motor inertia which is absorbed in the automatic transmission is not produced, and accordingly, transmission shock is reliably prevented.

BRIEF DESCRIPTION OF THE DRAWINGS

The advantages of the present invention will become apparent from the following detailed description along with the accompanying drawings, in which.

DESCRIPTION OF THE PREFERRED EMBODIMENT

Hereinafter, a preferred embodiment of the present invention will be exemplified by the following description along with the drawings.

Figure 1:
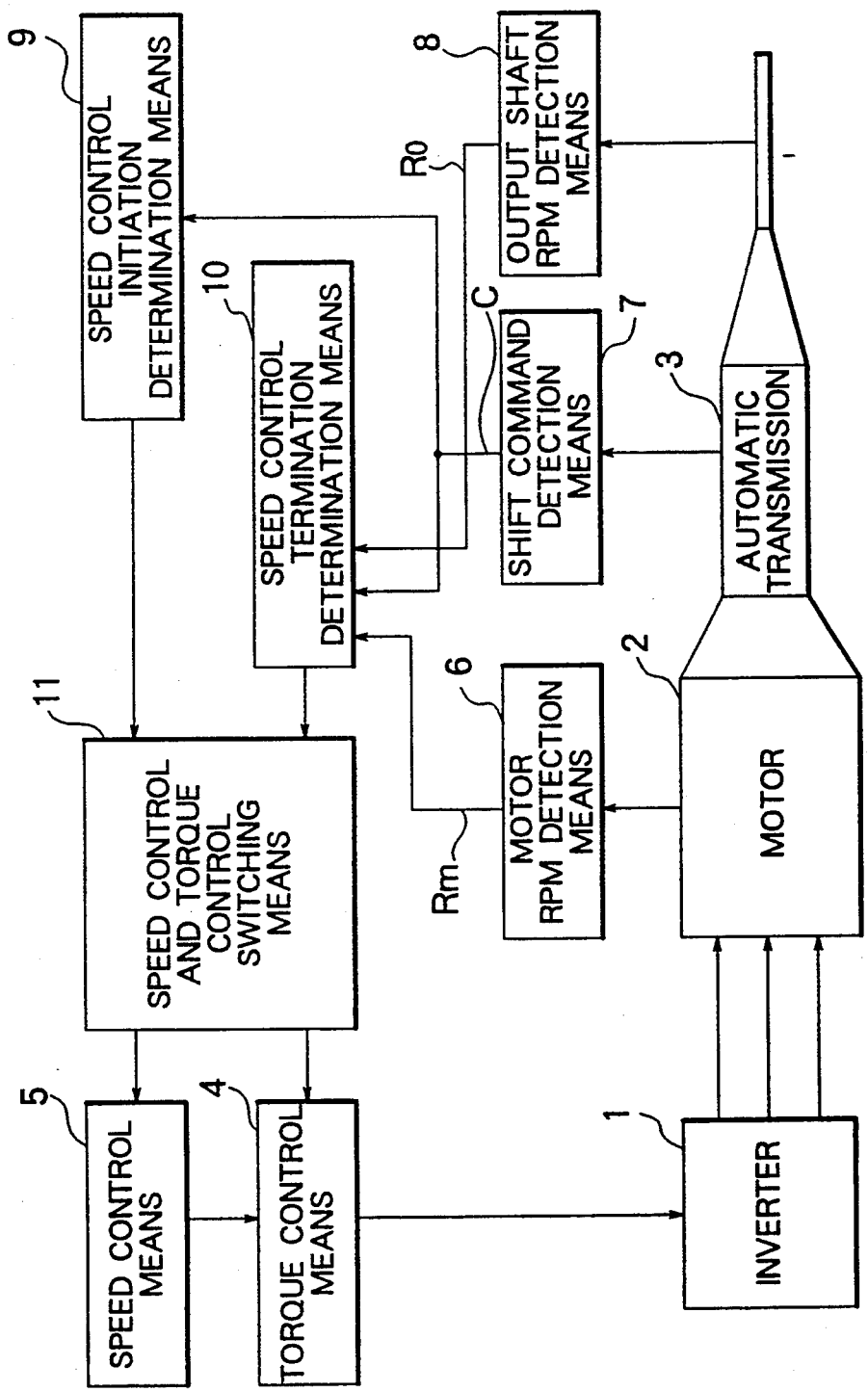
FIG. 1 is a block diagram showing a structure of an embodiment of the present invention.

FIG. 1 is a block diagram showing an embodiment of the present invention, wherein an inverter 1 forms an electric power supply circuit for a motor 2 driven by the inverter 1, an automatic transmission 3 is connected to the motor 2, a torque contol means 4 controls the torque of motor 2 by controlling the inverter 1, and a speed control means 5 controls the driving speed of motor 2 by controlling the torque control means.

A motor rpm detection means 6 detects rpm Rm of the motor 2 which corresponds to the input rpm Ri of the automatic transmission 3, a shift command detection means 7 detects the shift command C for the automatic transmission 3, an output shaft rpm detection means 8 detects the output shaft rpm Ro of the automatic transmission 3, and a speed control initiation determination means 9 determines the speed control initiation timing by detecting the shift command C.

Into a speed control termination determination means 10 the motor rpm Rm, the shift command C and the output shaft rpm Ro are input and the termination timing of the speed control is determined by comparing the motor rpm Rm with the divided output rpm value.

Into a speed control and torque control switching means 11 the output signals of the speed control initiation determination means 9 and of the speed control termination determination means 10 are input to respectively control the switching of the speed control or the torque control when necessary.

Figure 2:
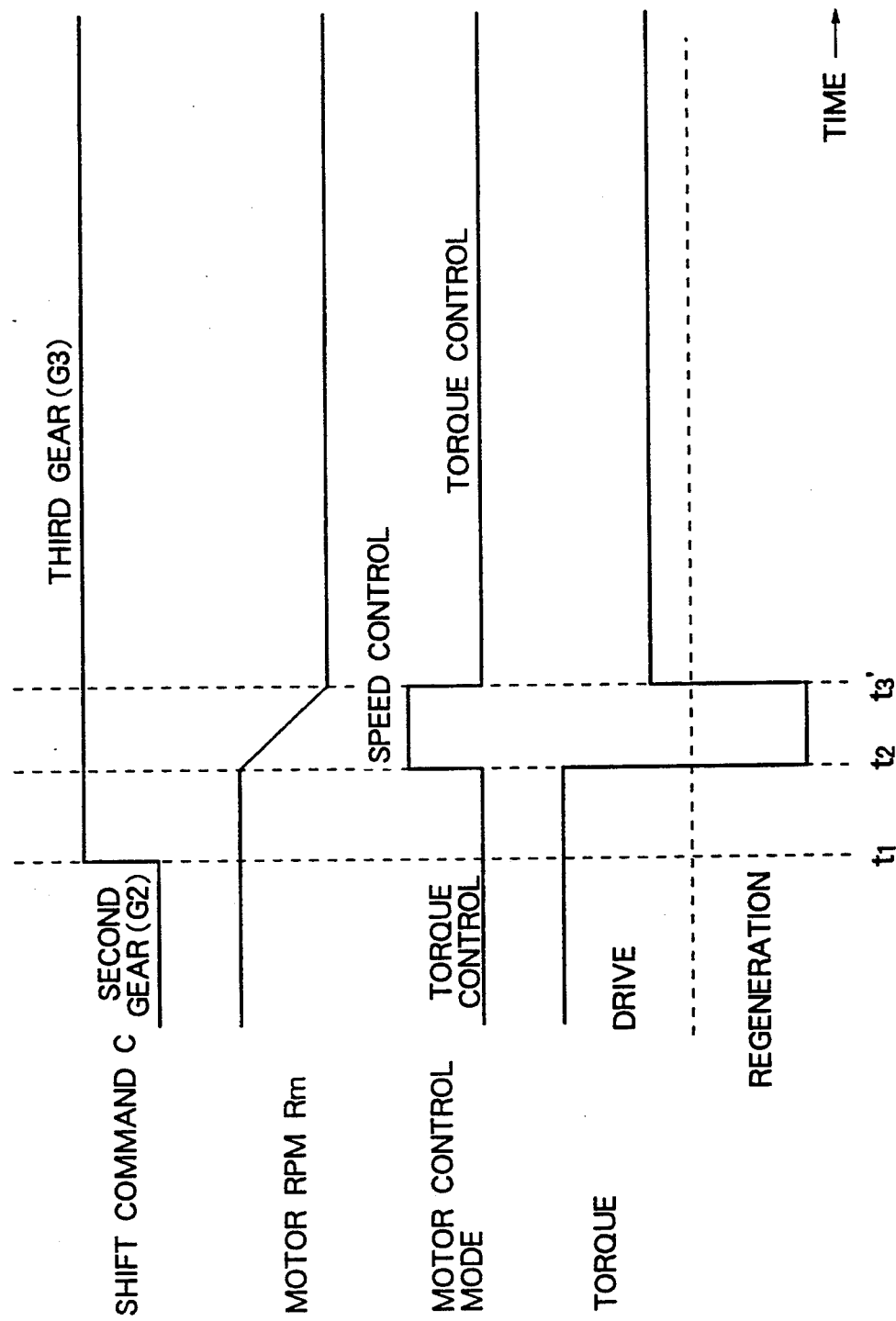
FIG. 2 is a timing chart showing the action by this embodiment of the invention.
Figure 3:
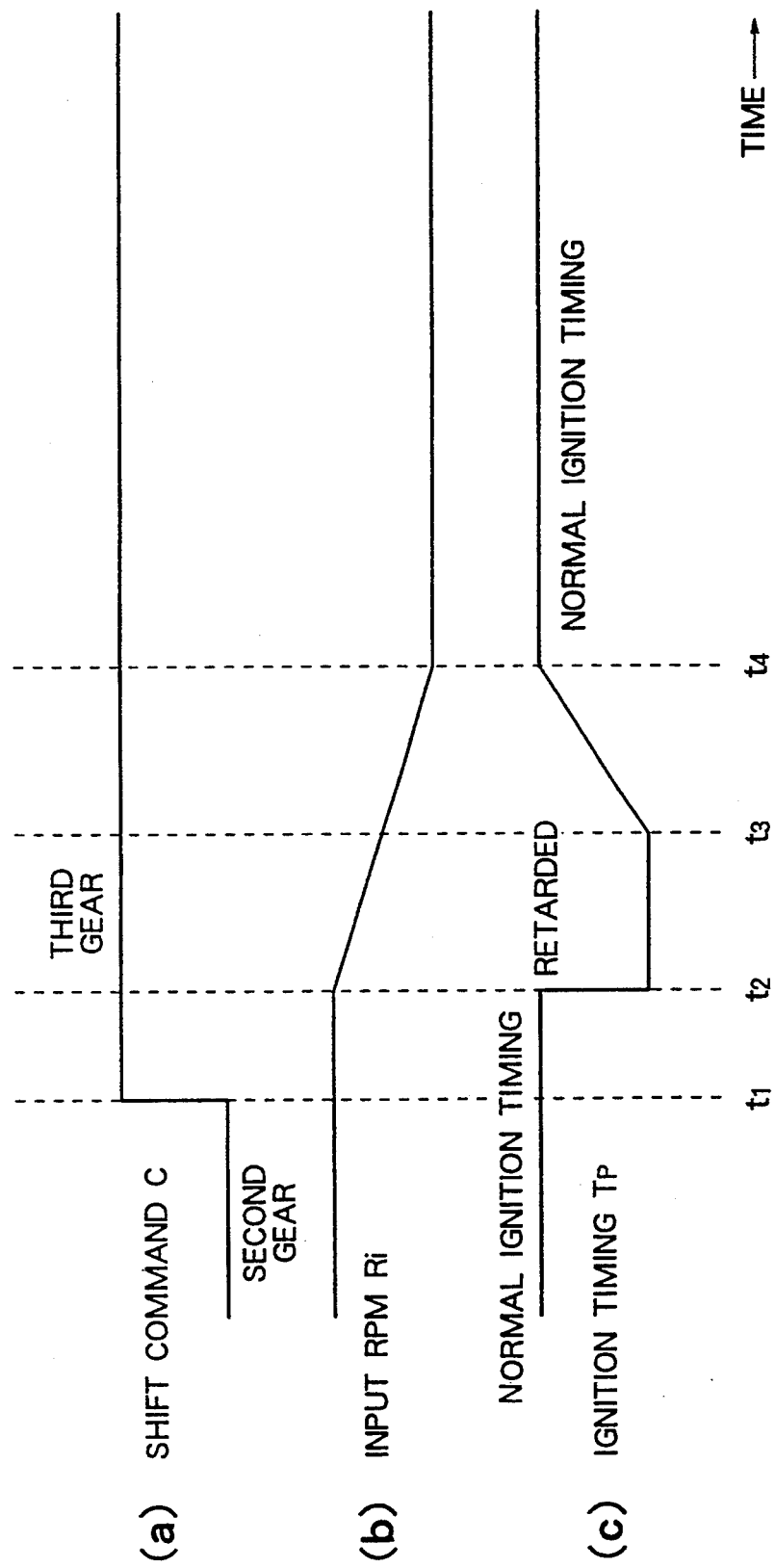
FIG. 3 is a timing chart showing the action of a conventional apparatus for preventing transmission shock in an automatic transmission equipped vehicle which is run by engine power via the automatic transmission.

Reference will now be made to the action of the embodiment of the present invention shown by the timing chart according to FIG. 2. Here, FIG. 2 shows the case of shifting up from second gear into third gear as mentioned before.

First, when the command C to shift from second gear to third gear is generated at time t1, the gear ratio starts shifting from G2 of second gear into G3 of third gear at time t2 after a response delay time has elapsed from the time t1.

At this time, however since a difference between the motor rpm Rm and the divided output rpm value is generated by the shifting of the gear ratios, the speed control and torque control switching means 11 switches the control for the motor 2 from the normal torque control into the speed control in response to an output signal from the speed control initiation determination means 9 at time t2 after the above mentioned response delay time elapses from the generating timing t1 of the shift command C.

First, the speed control initiation determination means 9 determines the speed control initiation timing t2 by detecting the shift command C, and the speed control termination determination means 10 determines the termination timing by comparing the motor rpm Rm with the divided output rpm value.

As a result, the speed control and torque control switching means 11 switches the speed control and the torque control based on the output signals from the speed control initiation determination means 9 and the speed control termination determination means 10.

Namely, the speed control and torque control switching means 11 controls the speed control means 5 to control the motor speed via the torque control means 4 and the inverter 1, whereby the regeneration torque from the motor 2 is generated. Accordingly, the difference between the motor rpm Rm and the divided output rpm value (the rpm difference) is rapidly reduced. Then, at time t3' when the rpm difference is reduced to no more than a fixed value, the control of the motor 2 is returned from speed control into normal torque control.

As mentioned above, the speed control initiation determination means 9 determines the speed control initiation based on the shift command C, and activates the speed control and torque control switching means 11 to switch the control of the motor 2 from torque control into speed control.

As a result, regeneration torque is generated from the motor 2 when up shifting, whereby the rpm difference in the automatic transmission 3 is instantly reduced to almost 0. Therefore, the shock from the inertia of motor 2 which is normally absorbed in the automatic transmission 3 is never generated, and transmission shock generated resulting from the energy accumulated in the moment of inertia of motor 2 can be reliably prevented.

On the other hand, the speed control termination determination means 10 activates the speed control and torque control switching means 11 to terminate the speed control and resume the torque control when the speed control termination for the motor 2 is determined by comparing the results of the rpm difference, i.e. when the difference between the motor rpm Rm and the divided output rpm value decreases to no more than a fixed value.

In the above embodiment, although only the case of shifting up has been described, it goes without saying that the above embodiment can be applied in the case of shifting down. Namely, in the case of shifting down, the transmission shock is reliably prevented by switching from the torque control into the speed control as mentioned above, since the drive torque is generated from the motor 2 so as to rapidly take up the desired speed.

What is claimed is:

1. An apparatus for preventing transmission shock in an automatic transmission equipped vehicle powered by an inverter driven motor via a transmission, wherein said apparatus comprises:

a torque control means for controlling a drive torque of said motor;

a speed control means for controlling a drive speed of said motor via said torque control means;

a motor rpm detection means for detecting an rpm of said motor;

a shift command detection means for detecting a shift command of an automatic transmission;

an output shaft rpm detection means for detecting an output shaft rpm of said automatic transmission;

a speed control initiation determination means for determining a timing for initiating a speed control of said motor by sensing said shift command;

a speed control termination determination means for determining a timing for terminating said speed control of said motor based on said output shaft rpm, said shift command and said motor rpm; and a speed control and torque control switching means for switching a control of said motor between said speed control and said torque control based on outputs of said speed control initiation determination means and said speed control termination determination means; where said speed control and torque control switching means switches said motor from said torque control into said speed control in response to said speed control initiation timing, and switches said motor from said speed control into said torque control in response to said speed control termination timing.

2. An apparatus for preventing transmission shock in an automatic transmission equipped vehicle as claimed in claim 1, wherein said speed control initiation determination means determines said initiation timing after a response delay time has elapsed from a time of detecting said shift command.

3. An apparatus for preventing transmission shock in an automatic transmission equipped vehicle as claimed in claim 1, wherein said speed control termination determination means determines said termination timing when a difference between said motor rpm and a value obtained by dividing said output shaft rpm by a gear ratio after shifting according to said shift command is no more than a fixed value.

4. An apparatus for preventing transmission shock in an automatic transmission equipped vehicle as claimed in claim 3, wherein while said motor is being in speed control, said speed control and torque control switching means reduces said difference between said motor rpm and said value obtained by dividing said output shaft rpm by said gear ratio after shifting according to said shift command.

5. An apparatus for preventing transmission shock in an automatic transmission equipped vehicle as claimed in claim 1, wherein while said motor is being in speed control, said speed control and torque control switching means reduces the difference between said motor rpm and a value obtained by dividing said output shaft rpm by a gear ratio after shifting according to said shift command.

* * * * *